United States Patent
Yao et al.

(10) Patent No.: US 7,154,659 B1
(45) Date of Patent: Dec. 26, 2006

(54) OPTICAL DEPOLARIZERS AND DGD GENERATORS BASED ON OPTICAL DELAY

(75) Inventors: X. Steve Yao, Diamond Bar, CA (US); Jane Chen, Diamond Bar, CA (US); Yongqiang Shi, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 190 days.

(21) Appl. No.: 10/418,712

(22) Filed: Apr. 17, 2003

Related U.S. Application Data (60) Provisional application No. 60/413,806, filed on Sep. 25, 2002, provisional application No. 60/373,767, filed on Apr. 18, 2002.

(51) Int. Cl.
*G02F 1/09* (2006.01)
*G02B 5/30* (2006.01)

(52) U.S. Cl. .............. 359/281; 359/495; 359/497; 385/11; 385/32

(58) Field of Classification Search ........... 359/280, 359/281, 495, 497; 385/11, 32
See application file for complete search history.

(56) References Cited

U.S. PATENT DOCUMENTS

| | | | | |
|---|---|---|---|---|
| 3,658,405 A | * | 4/1972 | Pluta | 359/371 |
| 3,881,823 A | * | 5/1975 | De Lang et al. | 356/487 |
| 4,969,720 A | * | 11/1990 | Lins et al. | 359/302 |
| 5,206,924 A | * | 4/1993 | Kersey | 385/24 |
| 5,818,626 A | * | 10/1998 | Engstrom et al. | 359/281 |
| 6,049,415 A | * | 4/2000 | Grubb et al. | 385/11 |
| 6,055,081 A | * | 4/2000 | Koyano et al. | 398/147 |
| 6,137,574 A | * | 10/2000 | Hill | 356/486 |
| 6,175,444 B1 | * | 1/2001 | Toyohara | 359/341.2 |
| 6,243,200 B1 | * | 6/2001 | Zhou et al. | 359/497 |
| 6,407,861 B1 | * | 6/2002 | Zhang et al. | 359/484 |
| 6,570,711 B1 | * | 5/2003 | Ducellier | 359/629 |
| 6,693,743 B1 | * | 2/2004 | Zhao | 359/495 |

* cited by examiner

*Primary Examiner*—Ricky D. Shafer
(74) *Attorney, Agent, or Firm*—Fish & Richardson P.C.

(57) ABSTRACT

Techniques and devices for depolarizing light and producing a variable differential group delays in optical signals. In one implementation, an input optical beam is split into first and second beams with orthogonal polarizations. One or two optical reflectors are then used to cause the first and second optical beams to undergo different optical path lengths before they are recombined into a single output beam. An adjustment mechanism may used implemented to adjust the difference in the optical path lengths of the first and second beams to produce a variable DGD. When the depolarization of light is desired, the difference in the optical path lengths of the first and second beams is set to be greater than the coherence length of the input optical beam.

11 Claims, 6 Drawing Sheets

Orientation of the input SOP

FIG. 5

Orientation of the optical
axis c of the λ/4 plate

OPTICAL DEPOLARIZERS AND DGD GENERATORS BASED ON OPTICAL DELAY

This application claims the benefits of U.S. Provisional Application Nos. 60/373,767 filed Apr. 18, 2002 and 60/413,806 filed Sep. 25, 2002, which are incorporated herein by reference as part of the disclosure of this application.

BACKGROUND

This application relates to optical devices, and in particular, to optical depolarizers and devices for generating differential group delays (DGDs) and their applications.

Optical depolarizers are optical devices for reducing the degree of optical polarization of an input optical beam or randomizing the input polarization. Applications for such depolarizers include but are not limited to optical networks, test & measurement, and sensor applications. In an optical network application, for example, a depolarizer may be used to eliminate polarization sensitivity of Raman amplifiers. In test and measurement systems, depolarizing the output beam from a source laser may be used to eliminate polarization sensitivity of many test instruments.

Generation of variable DGDs has applications in optical communication systems and devices where polarization-mode dispersion (PMD) is present.

SUMMARY

This application includes techniques and devices to depolarize light and to produce a desired differential group delay in optical signals. In general, an input optical beam is split into first and second beams with orthogonal polarizations. One or two optical reflectors are then used to cause the first and second optical beams to undergo different optical path lengths before they are recombined into a single output beam. An adjustment mechanism may be implemented to adjust the difference in the optical path lengths of the first and second beams to produce a variable DGD. When the depolarization of light is desired, the difference in the optical path lengths of the first and second beams is set to be greater than the coherence length of the input optical beam.

In one exemplary implementation, a device of this application may include a first polarization beam splitter (PBS), a second PBS, and a reflector arranged to form an optical system. The first PBS is positioned to receive an input optical beam with a coherent length and to split the input optical beam into a first beam and a second beam polarized orthogonal to the first beam. The reflector is positioned to reflect the first beam to the second PBS to cause an optical path difference between the first and the second beams at the second PBS to be greater than the coherent length. The second PBS is positioned to receive and combine the first and the second beams to produce an output beam.

In another exemplary implementation, a device of this application may include a polarization beam splitter (PBS) to receive an input optical beam with a coherent length and to split the input optical beam into a first beam and a second beam polarized orthogonal to the first beam. The device also includes first and second reflectors, first and second polarization elements. The first reflector is positioned relative to the PBS to reflect the first beam back to the PBS. The first polarization element is located between the first reflector and the PBS to rotate a polarization of a reflection of the first beam at the PBS to be perpendicular to the first beam when initially exiting the PBS. The second reflector is positioned relative to the PBS to reflect the second beam back to the PBS. The second polarization element is located between the second reflector and the PBS to rotate a polarization of a reflection of the second beam at the PBS to be perpendicular to the second beam when initially exiting the PBS. The first and the second reflectors are positioned to produce a difference in optical paths of the first and the second beams upon being reflected back to the PBS that is greater than the coherent length of the input optical beam.

The above and other devices of this application may operate as depolarizers. In addition, such devices may also be applied to produce a fixed pure first-order differential group delay (DGD). Pure first order DGD can have important applications in compensating for polarization mode dispersion. The DGD devices may be designed with low fabrication cost and compact size in order to compete with PM fibers. The polarization insensitive version of such a device may also be used as a passive bandwidth limiter.

These and other implementations, features, and associated advantages are now described in detail with reference to the drawings, the detailed description, and the claims.

DETAILED DESCRIPTION

The techniques and devices of this application split an input optical beam at an input location into first and second beams with orthogonal polarizations. At least one reflector is used to reflect the first input beam along a path different from the second beam to produce a difference in optical path lengths of the two beams at a common location where they are recombined into a single output beam.

Figure 1:
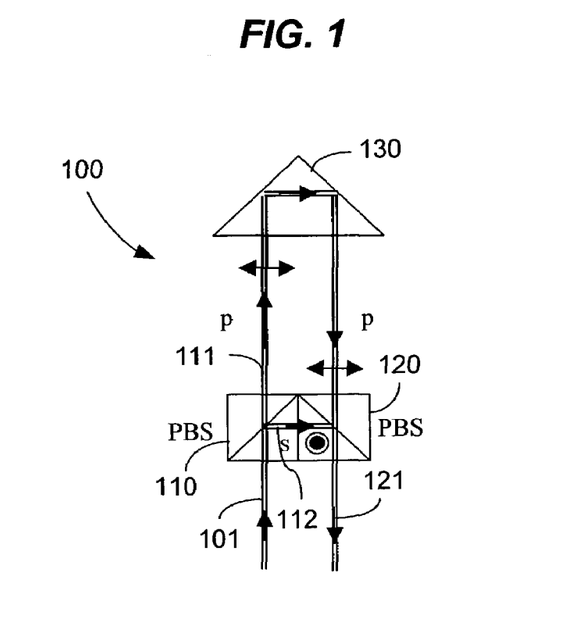
FIG. 1 shows an exemplary device for depolarization or generating a variable DGD, which includes two polarization beam splitters (PBS) and an optical reflector such as a prism reflector.

FIG. 1 shows one implementation of a depolarizer 100 which includes two polarization beam splitters (PBSs) 110 and 120 and an optical reflector 130 such as a prism reflector. The first PBS 110 is used as an input port to receive input light 101 and to split input light into two orthogonal linear polarizations 111 and 112. The transmitted polarization 111, e.g., the P polarized light, is directed to the prism reflector 130. The reflected polarization 112, e.g., the S polarized light, is directed to the second PBS 130. The transmitted P polarized light 111, after reflected by the prism reflector 130, is directed to the second PBS 120. The second PBS 120 combines the S and P polarized beams 112 and 111 to produce the output beam 121. When operated under proper conditions, this output beam 121 is depolarized.

Notably, the distance between the prism reflector 130 and the two PBSs 110 and 120 may be sufficiently long to be greater than the coherent length of the input optical beam 101 so that the S and P polarized-beams 112 and 111 received by the second PBS 120 are no longer coherent with each other. This condition allows the output light 121 from the second PBS 120 to be effectively depolarized. For a linear input beam 101, the input polarization should be at 45 degrees with respect to the passing polarization axis of the first PBS 110 to evenly split the input power between two output beams 111 and 112 of the first PBS 110.

In one implementation, an input fiber may be used to direct the input beam 101 to the first PBS 110. Accordingly, an output fiber may be used to receive the output beam 121 from the second PBS 120. The input fiber may be polarization maintaining (PM) and the input light 101 is oriented 45° from the passing axis of the first PBS 110. Under this condition, the linearly polarized input light 101 is split into "s" and "p" components 112 and 111 with equal power levels. Assuming the PBS 110 reflects the "s" component 112 and transmits the "p" component 111, the "p" component 111 undergoes a longer optical path than the "s" component when they reach the second PBS 120. In order to achieve effectively depolarization, the optical path difference between the two components 111 and 112 should be larger than the coherence length of the light source for producing the input light 101. In comparison with a typical birefringent-crystal-based Lyot depolarizer, this device 100 has the advantage of smaller size because of the double pass free-space design. In addition, the cost of the device 100 can be low because no birefringent crystal is required. Table I shows the minimum device length for light source with different linewidth. The length of this depolarizer may be significantly shorter than a typical Lyot depolarizer, e.g., as much as 10 times less than that of a single section Lyot depolarizer.

TABLE I

| Linewidth | Coherent length | Length of GP depolarizer | Length of Lyot depolarizer (Δn = 0.2) |
| --- | --- | --- | --- |
| 1 nm | 2.4 mm | 1.2 mm | 12 mm |
| 0.1 nm | 24 mm | 12 mm | 120 mm |
| 0.01 nm | 240 mm | 120 mm | 1200 mm |

When the input fiber that feeds the input light 101 to the PBS 110 is implemented with a single mode fiber, the device 100 may be operated as a differential group delay line (DGD) for PMD compensation because different polarization components undergo different optical path delays. As a variable DGD generator, it is not necessary that the difference in the optical path lengths in the device 100 be greater than the coherence length of the input light. The relationship between the minimum device length (excluding lengths of PBS and reflection prism) and DGD is listed in Table II.

TABLE II

| DGD | Equivalent optical path length | Device length |
| --- | --- | --- |
| 10 ps | 3 mm | 1.5 mm |
| 25 ps | 7.5 mm | 3.75 mm |
| 50 ps | 15 mm | 7.5 mm |
| 100 ps | 30 mm | 15 mm |
| 200 ps | 60 mm | 30 mm |

The design 100 shown in FIG. 1 may be used to construct compact DGD components. In addition, because the light beams propagate in the air between the PBSs 110 and 120 and the prism reflector 130 within the depolarizer 100 and the air has negligible dispersion, the device 100 may operate to produce a pure first order DGD.

The depolarizer 100 described in FIG. 1 is sensitive to the input polarization. In many applications, polarization insensitivity may be desirable. FIGS. 2A, 2B, 3A, and 3B illustrate two configurations that can eliminate the polarization sensitivity of the device in FIG. 1.

Figures 2A, 2B:
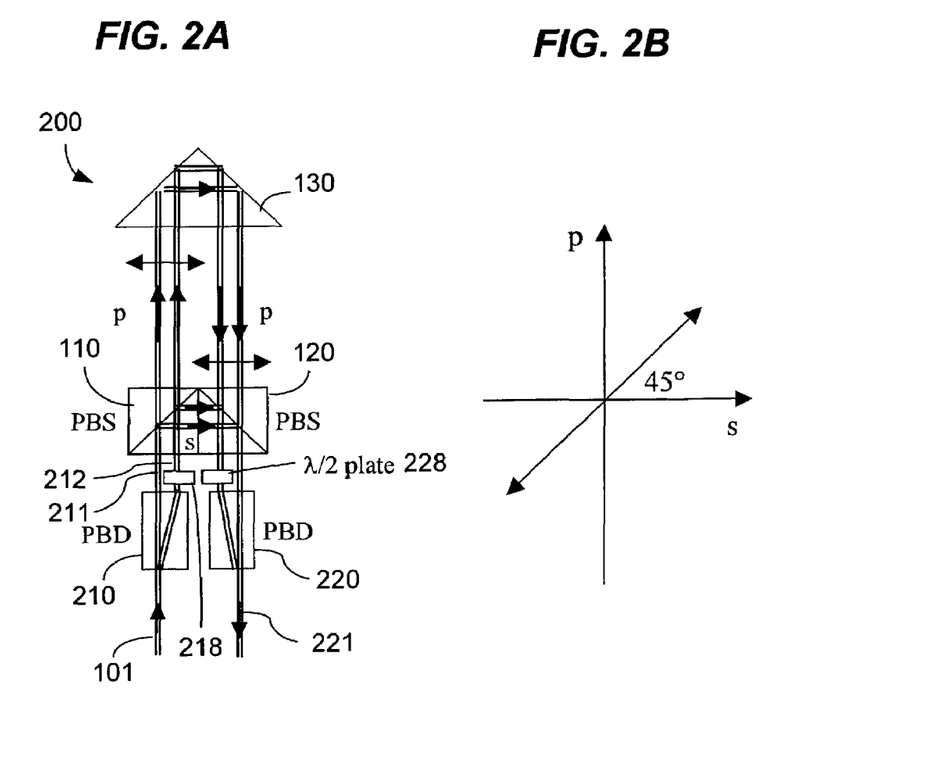
FIG. 2A shows an exemplary polarization-insensitive device of this application.
FIG. 2B illustrates orientations of polarizations in the device in FIG. 2A.

FIG. 2A shows the first polarization-insensitive depolarizer 200 according to one implementation. An input polarization beam displacer (PBD) 210 is placed in the input of the first PBS 110 to separate two polarization components into two parallel paths 211 and 212 into the first PBS 110. A polarization rotator 218 such as a half wave plate is placed in one of the parallel paths to rotate the polarization in that path by 900. Consequently, the two parallel input beams 211 and 212 have the same linear polarization when entering the first PBS 110. The input PBD 210 is oriented in such a way that the linear polarization of the two input beams 211 and 212 is 45° from the passing axis of the first PBS 110, as shown in FIG. 2B. As a result, each beam is split into two beams by the first PBS 110. The "p" component transmitting through the PBS 110 goes through a longer optical path through the reflector 130 before combining with the "s" component at the second PBS 120. Finally, the two beams are combined by a second, output PBD 220 to produce a depolarized output beam 221. A second half wave plate 228 is placed in one of the parallel paths between the PBS 120 and the PBD 220 to rotate the polarization in that path by 90°. The PBD 220 is oriented complementarily from the first input PBD 210 to allow two parallel input beams with orthogonal polarizations to be combined into the single output beam 221. This output beam 221 may then be directed into the output fiber in a fiber system.

The PBDs 210 and 220 may be implemented in various configurations. For example, a properly-cut birefringent crystal, such as calcite, may be used to separate the ordinary and extraordinary beams with orthogonal polarizations as parallel output beams. The ordinary polarization transmits straight through while the extraordinary transmits through the crystal at an angle with respect to the ordinary beam and emerges parallel to the ordinary beam.

Figures 3A, 3B:
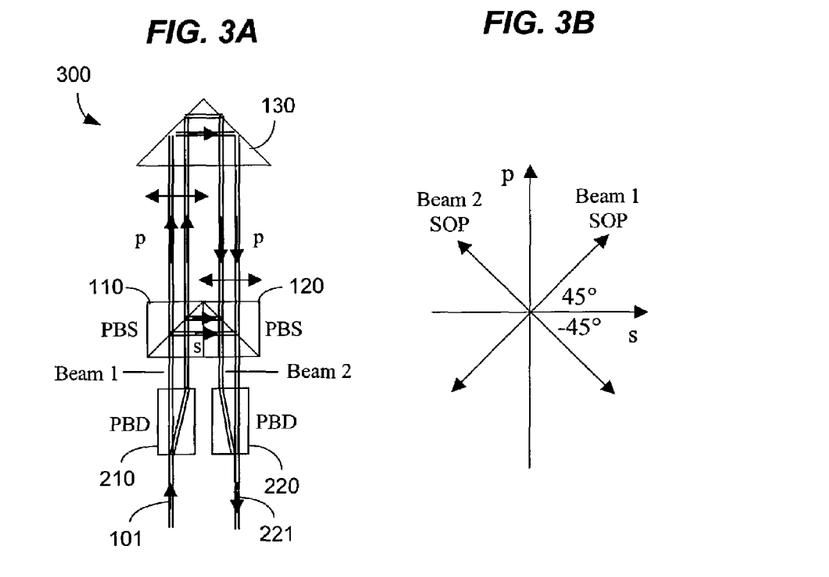
FIGS. 3A and 3B show another exemplary polarization-insensitive device and the orientation of an input polarization beam displacer with respect to the input state of polarization.

In a different configuration 300 shown in FIG. 3A, a first PBD 210 is used to receive an input beam 101 and separates the beam 101 upon transmission into two parallel beams 211 and 212 with orthogonal polarizations. The PBD 210 is so oriented that the two orthogonal polarizations are +/− 45° from the passing axis of the PBS as shown in FIG. 3B. Consequently, each beam is split into "s" and "p" components. Similarly, the "p" component travels along a longer optical path through the reflector 130 before being combined with the "s" component at the second PBS 120. Finally, the two beams are combined by a second PBD 220 oriented complementarily from the first PBD 210 to produce the depolarized output beam 221. In this configuration, the half wave plates 218 and 228 used in FIG. 2A are eliminated to reduce the cost of the device and to reduce its wavelength sensitivity introduced by the half wave plates.

A pure first order DGD may be used in the polarization mode dispersion compensation. However, the DGD device should be compact and can be manufactured at a low cost in order to compete with a PM fiber DGD device. The above depolarizers may be used to produce such pure first order DGDs for various applications.

Notably, an adjustment mechanism may be implemented in the above and other exemplary devices of this application to adjust the spacing between the prism reflector 130 and the PBSs 110 and 120 to produce different or variable first order DGDs. This adjustment mechanism may be implemented by, e.g., engaging the reflector 130 to a movable element that moves its position to change the position of the reflector 130 in response to a control signal. Alternatively, the two PBSs 110 and 120 may be engaged to the movable element to move relative to the reflector 130.

The following sections of this application describe additional exemplary designs of optical depolarizers, including, among others, designs with a long coherence length. Notably, FIGS. 4. 6, 7A, 8 and 9 show exemplary implementations of a different device configurations for either optical depolarization or generation of variable DGDs by using two separate reflectors to form two separate reflection optical paths.

Figure 4:
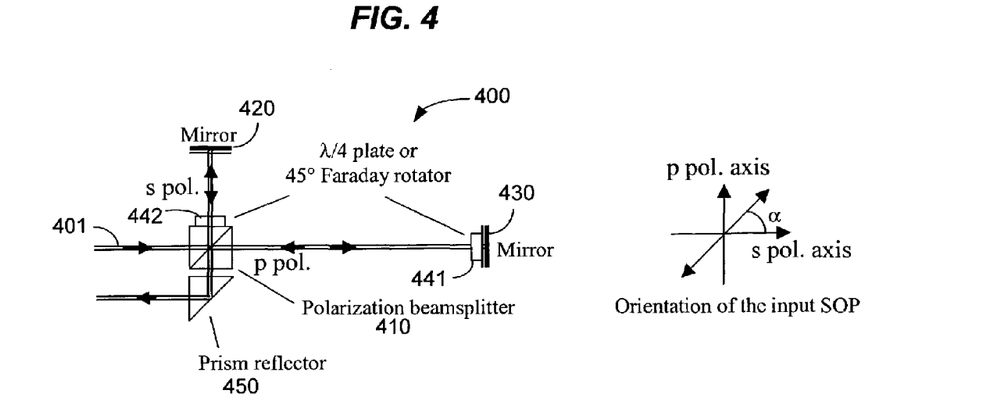
FIG. 4 shows one implementation of a device having a polarization beam splitter and two optical reflectors.

This type of design uses a polarization beam splitter (PBS) 410 to receive an input optical beam with a coherent length and to split the input optical beam into a first beam and a second beam polarized orthogonal to the first beam. First and second reflectors 420 and 430, first and second polarization elements 441 and 442 are used to form two different optical reflection arms. The first reflector 430 is positioned relative to the PBS 410 to reflect the first beam back to the PBS 410. The first polarization element 441 is located between the first reflector 430 and the PBS 410 to rotate a polarization of a reflection of the first beam at the PBS 410 to be perpendicular to the first beam when initially exiting the PBS 410. The second reflector 420 is positioned relative to the PBS 410 to reflect the second beam back to the PBS 410. The second polarization element 442 is located between the second reflector 420 and the PBS 410 to rotate a polarization of a reflection of the second beam at the PBS 410 to be perpendicular to the second beam when initially exiting the PBS 410. The first and the second reflectors 430 and 420 are positioned to produce a difference in optical paths of the first and the second beams upon being reflected back to the PBS 410. When operated as an optical depolarizer, this difference is set to be greater than the coherent length of the input optical beam.

FIG. 4 shows one implementation of a depolarizer 400 having a polarization beam splitter 410 and two optical reflectors 420 and 430. The polarization beam splitter (PBS) 410, two polarization rotators 441 and 442, two mirrors (reflectors) 420 and 430 and a prism reflector 450 are arranged as illustrated. The input light 101 may be delivered to the input facet of the PBS 410 with the input SOP oriented a degrees from the passing axis of the PBS. An input fiber, made of a polarization maintaining (PM) fiber having one polarization axis aligned at α degrees from the passing axis of the PBS, may be used to deliver the input light to the PBS 410. Each of the polarization rotators 441 and 442 may be either a 45-degree Faraday rotator or a quarter-wave plate.

Under this input condition, the linearly polarized input light 401 is split by the PBS 410 into two orthogonally polarized beams 412 and 411: the "s" and "p" components. Assuming the PBS 410 reflects the "s" component 412 and passes the "p" component 411, the "p" component 411 goes through a longer optical path than the "s" component 412. After reflection from the mirrors 420 and 430, the "s" component 412 becomes "p" and the "p" components 411 becomes "s" so that both components are directed towards the prism reflector 450 by the PBS 410. In order to achieve effective depolarization, it is desirable that the optical path difference between the two components be larger than the coherence length of the light source that produces the input light 401. In comparison with a typical Lyot depolarizer, this device 400 has the advantage of smaller size because of the double pass free-space design. In addition, the cost of the device 400 is also lowered because no birefringent crystal is required. Table III shows the minimum device length for light source with different linewidth. As indicated, the length of GP's depolarizer is 10 times less than that of a single section Lyot depolarizer.

In this implementation, the powers of the "s" and "p" components 412 and 411 should also be equal at the output in order to be an effective depolarizer. Assuming the transmission coefficients of the "s" and "p" components are $T_s$ and $T_p$ respectively, the orientation angle α of the input SOP should be:

$$\alpha = \tan^{-1}(T_s/T_p).$$

Note that if quarter waveplates are used as the polarization rotator 441 or 442, the relative orientation angle of the waveplates should be 450 from the passing axes of the polarization beamsplitter 410. This alternative design is shown in FIG. 5.

TABLE III

| Linewidth | Coherent length | Length of GP depolarizer | Length of Lyot depolarizer (Δn = 0.2) |
|---|---|---|---|
| 1 nm | 2.4 mm | 1.2 mm | 12 mm |
| 0.1 nm | 24 mm | 12 mm | 120 mm |
| 0.01 nm | 240 mm | 120 mm | 1200 mm |

Figure 5:
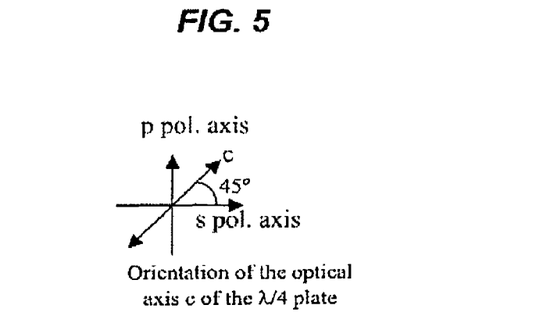
FIG. 5 shows the orientation of quarter waveplates used in the device in FIG. 4 for rotating optical polarization of each reflected beam.

If the input fiber coupled to the PBS 410 is implemented with a single mode fiber, the device in FIG. 4 or FIG. 5 can be used as a differential group delay (DGD) line for PMD compensation because different polarization components undergo different optical path delays. The relationship between the minimum device length (excluding lengths of PBS and reflection prism) and DGD is listed in Table IV. Highly compact DGD component can be made with this approach. In addition, because the light beams are propagating in the air and the air has negligible dispersion, the device can be used to produce a pure first order DGD.

TABLE IV

| DGD | Equivalent optical path length | Device length |
|---|---|---|
| 10 ps | 3 mm | 1.5 mm |
| 25 ps | 7.5 mm | 3.75 mm |
| 50 ps | 15 mm | 7.5 mm |
| 100 ps | 30 mm | 15 mm |
| 200 ps | 60 mm | 30 mm |

Figure 6:
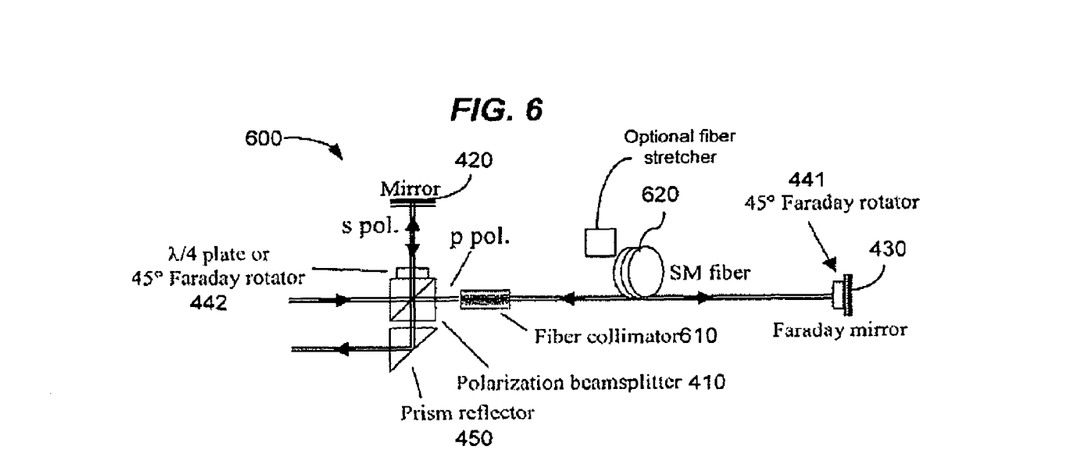
FIG. 6 shows a modified device based on the designs in FIGS. 4 and 5 by using a Faraday reflector in one reflection optical path and a fiber to provide a long optical delay relative to another reflection optical path.

FIG. 6 shows a configuration 600 that is capable of depolarizing light of a long coherence length. In this configuration, a fiber collimator 610 is used to focus the light of "p" polarization into a single mode fiber 620 as an optical path between the PBS 410 and the reflector 430. A 90-degree Faraday mirror is formed by the reflector 430 and a 45-degree Faraday rotator 441 at the other end of the fiber 620 to reflect the light back onto the polarization beamsplitter 410. Due to the unique ortho-conjugate property of the Faraday mirror, the reflected light is orthogonally polarized with respect to the forward propagating light everywhere along the fiber 620, despite of the birefringence in the single mode fiber 620. Consequently, the reflected light becomes a "s" polarized light at the PBS 410 and is reflected towards the output to combine with light that travels in the short path formed by the reflector 420. Different from the polarization rotator 441 which must be a 45-degree Faraday rotator right in front of the reflector 430, the polarization rotator 442 may be located at the PBS 410 and may be either a 45-degree Faraday rotator or a quarter-wave plate. The single mode fiber 620 can be easily and inexpensively used as a long optical path with a length up to many kilometers. Therefore, with this configuration, the device 600 can depolarize light with a extremely long coherence length.

Assuming the transmission coefficients of the two paths are $T_1$ and $T_2$ respectively, the orientation angle α of the input SOP should be $\alpha = \tan^{-1}(T_1/T_2)$ in order to have an equal power or the least DOP at the output.

In principle, a polarization combiner may operate as a polarization depolarizer by combining two independent lasers of orthogonal SOP into a single beam. However, the optical powers of the two lasers should be equalized in order to obtain small enough DOP. Equalization of the two lasers may require actively monitoring the laser powers and feedback control the power of one of the lasers, resulting in an increased system cost.

Figure 7A:
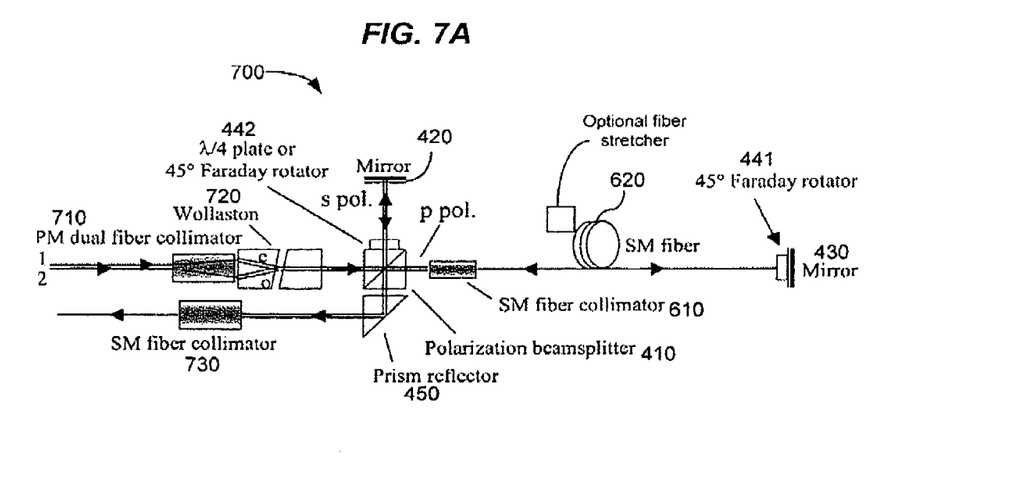
FIG. 7A shows a device based on the designs in FIGS. 4 and 5 with a dual fiber collimator and a prism polarization beam combiner in the input path.

FIG. 7A shows a device 700 that combines a polarization beam combiner with a depolarizer. Using this device 700, two laser beams 1 and 2 may be easily combined with a minimum DOP, without the need to equalize the powers of the lasers that generate the laser beams 1 and 2, respectively. A PM dual fiber collimator 710 is used to collimate the laser beams 1 and 2 carried by two input PM fibers with orthogonal polarizations. A polarization beam combiner 720, such as a Wollaston prism, is used to combine the orthogonally polarized beams 1 and 2 from the two input PM fibers respectively carrying the beams 1 and 2 into a single input beam. A fiber collimator 730 may be used to receive and collimate the depolarized output beam from the prism reflector 450. As illustrated, the Wollaston prism 720 includes two birefringent prisms that are either spaced or cemented to combine two beams with mutually orthogonal polarizations into one beam. One used in the reverse direction, a single unpolarized beam can be separated into two diverging beams with mutually orthogonal polarizations.

Figure 7B:
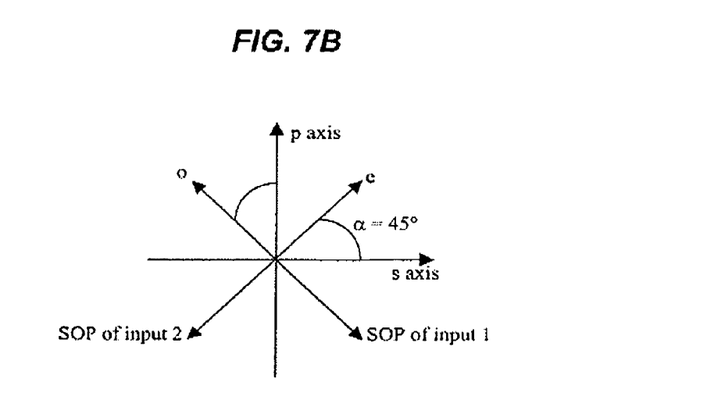
FIG. 7B shows relevant states of polarization in the device in FIG. 7A.

FIG. 7B shows relevant states of polarization in the device 700, where the collimator 710 and prism 720 are so oriented that both polarizations are 45° from the passing axis of the PBS 410. In order for the optical powers at the output fiber from the short path and long path to be the same, the mirror 420 in the short path may be slightly mis-aligned to accommodate for the slightly higher loss in the long path.

Figure 8:
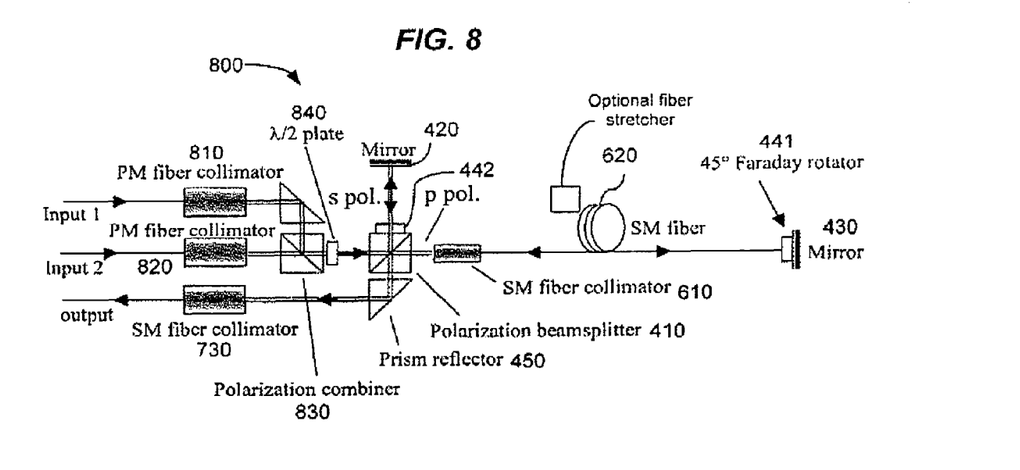
FIGS. 8 and 9 show two additional exemplary devices based on the design in FIG. 4.

An alternative configuration is shown in FIG. 8. In this configuration, a cube polarization combiner 830 is used to replace the Wollaston prism 720 in FIG. 7A to combine two input beams into one input beam to the PBS 410. As illustrated, an optional half wave plate 840 may be used to rotate the two input polarization states so that they are 45° from the passing axis of the polarization beam splitter 410. The rest of the arrangement is identical to that in FIG. 7A.

Figure 9:
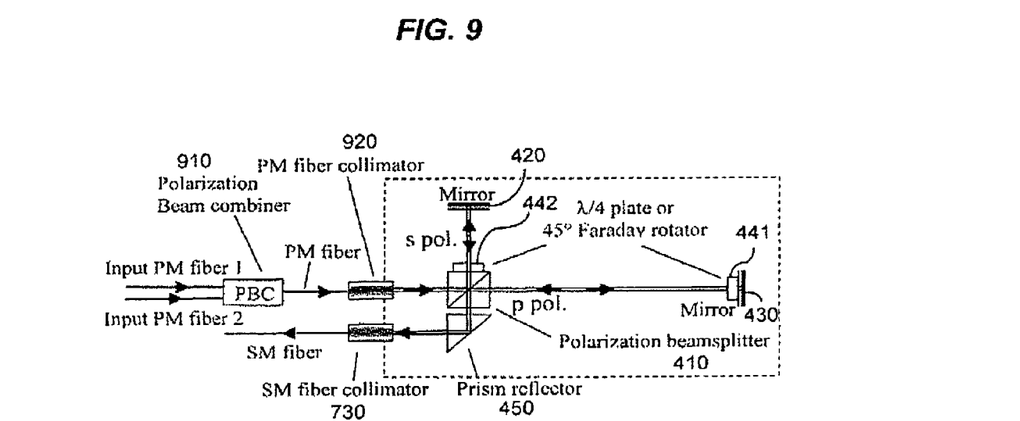

A fiber pigtailed polarization beam combiner (PBC) 910 may be cascaded with the depolarizer depicted in FIG. 4 or FIG. 5 to form a PBC/depolarizer, as shown in FIG. 9. In this configuration, the fiber pigtails of the PBC should be of PM fiber and the PM fiber collimator should be rotated such that the slow axis is 45° from the passing axis of the PBS.

Based on the above designs, fiber-coupled devices may be made to have specifications listed in TABLES V and VI.

TABLE V

| Specification of an exemplary depolarizer | |
|---|---|
| Insertion loss | <0.75 dB |
| Operation linewidth | <0.1 nm |
| Return loss | 50 dB min. |
| Center wavelength | 1550 nm, 1310 nm |
| Wavelength range | +/− 100 nm |
| DOP | <5% |
| Input fiber | PM for polarization sensitive version |
| | SM for polarization insensitive version |
| Output fiber | SM |
| Operation temperature | 0 to 60 degree C. |
| Storage temperature | −40 to +80 degree C. |
| Power handling | >300 mW |

TABLE VI

| Specification for an exemplary first order DGD device | |
|---|---|
| Insertion loss | <0.75 dB |
| 1$^{st}$ order DGD | 12 ps, 25 ps, 50 ps, 86 ps |
| Return loss | 50 dB min. |
| Center wavelength | 1550 nm, 1310 nm |
| Wavelength range | +/− 100 nm |
| Higher order PMD | <10 ps$^2$ |
| Input fiber | SM |
| Output fiber | SM |
| Operation temperature | 0 to 60 degree C. |
| Storage temperature | −40 to +80 degree C. |
| Power handling | >300 mW |

In the devices shown in FIGS. 4, 6, 7A, 8, and 9, the position of one of the reflectors 420 and 430 may be adjusted to vary the relative optical delay between the two reflected optical signals from the reflectors 420 and 430 to produce a variable DGD. In the device in FIGS. 6, 7A, and 8, the fiber 620 may be engaged to a fiber stretcher or other device to vary the fiber length to produce the desired variable DGD.

Figure 10:
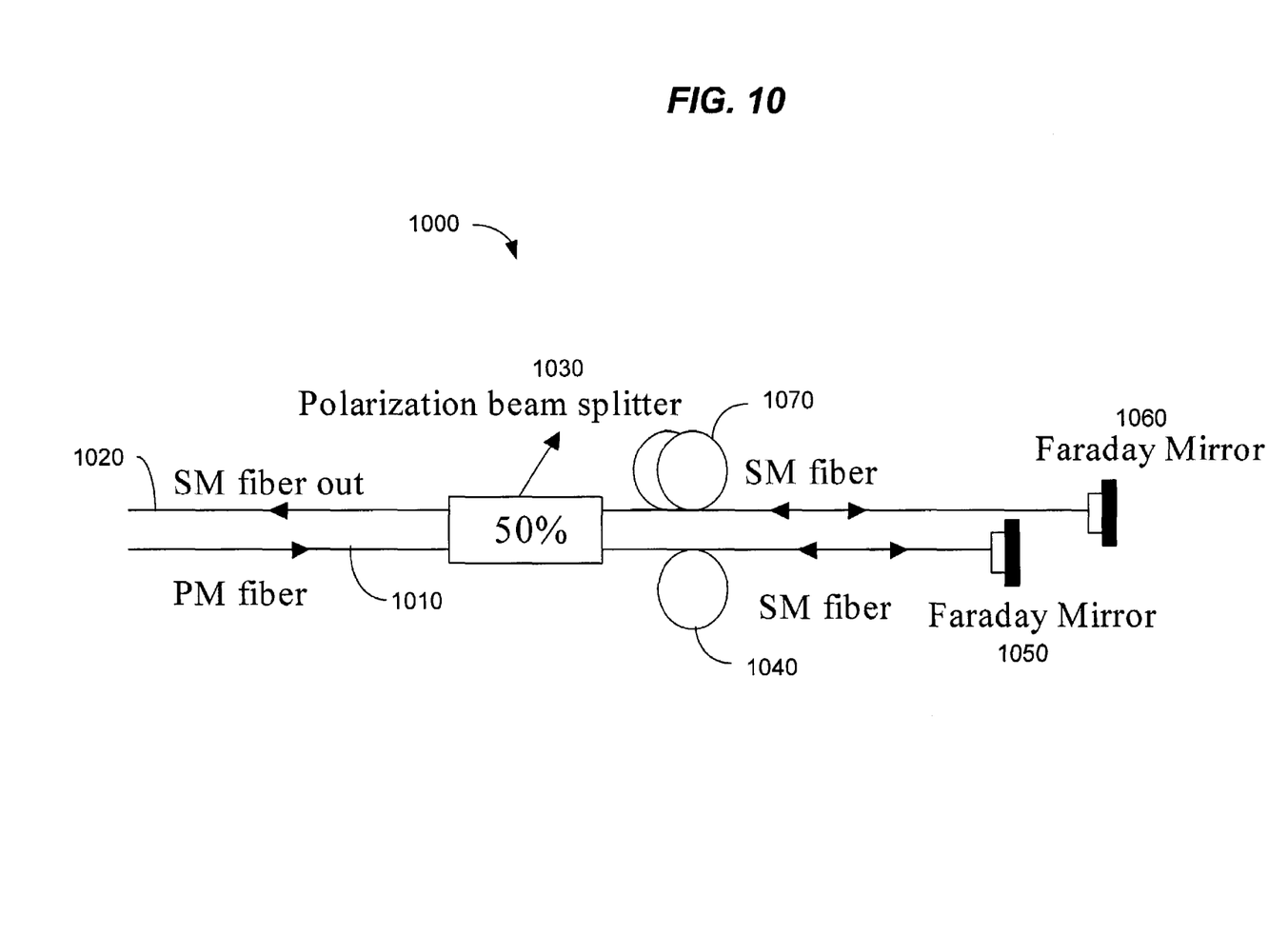
FIG. 10 shows yet another design for implementing depolarizers or DGD generators.

FIG. 10 shows yet another design 1000 for implementing depolarizers or DGD generators based on optical delay in two different optical paths. The design 1000 includes two optical paths formed by two Faraday reflectors 1050 and 1060 with two single-mode fibers 1040 and 1070, respectively. An input PM fiber 1010 is used to carry the input optical signal. The input PM fiber 1010 is oriented such that the incoming light is split 50% each into the two single mode fibers 1040 and 1070 of different lengths. As illustrated, a polarization beam splitter 1030 is engaged to the input PM fiber 1010 to perform this power splitting to produce two orthogonally-polarized beams that are respectively coupled into the fibers 1040 and 1070. At the opposite ends of the fibers 1040 and 1070 are coupled with the Faraday reflectors 1050 and 1060, respectively. Each Faraday reflector may be formed by a 45-degree Faraday rotator and a reflector. The reflected signals are directed back to the polarization beam splitter which now operates as a polarization beam combiner in this reversed input condition. The two reflected signals are combined into a single output beam. On the other side of the splitter 1030, a single-mode output fiber 1020 is coupled to receive the output beam.

The device 1000 may be used as a variable DGD generator where a mechanism is implemented to adjust the difference in the optical path lengths of two fibers 1040 and 1070. A fiber stretcher, for example, may be engaged to one fiber to change the difference. When used as a depolarizer, the difference is set to be greater than the coherence length of the input signal.

Only a few implementations are disclosed. However, it is understood that variations and enhancements may be made without departing from the spirit of and are intended to be encompassed by the following claims.

What is claimed is:

1. A device, comprising:
   a polarization beam splitter (PBS) to receive an input optical beam with a coherent length and to split the input optical beam into a first beam and a second beam polarized orthogonal to said first beam;
   a first reflector positioned relative to said PBS to reflect said first beam back to said PBS;
   a 45-degree Faraday rotator located in front of said first reflector to change a polarization of light passing therethrough;
   a fiber coupled between said PBS and said Faraday rotator to transmit said first beam between said PBS and said first reflector;
   a second reflector positioned relative to said PBS to reflect said second beam back to said PBS; and
   a polarization element located between said second reflector and said PBS to rotate a polarization of a reflection of said second beam at said PBS to be perpendicular to said second beam when initially exiting said PBS, wherein said first and said second reflectors are positioned to produce a difference in optical paths of said first and said second beams upon being reflected back to said PBS.

2. The device as in claim 1, further comprising a fiber stretcher engaged to said fiber to change a length of said fiber.

3. The device as in claim 1, wherein said difference is greater than said coherent length.

4. The device as in claim 1, further comprising an optical collimator between said PBS and said fiber to collimate light.

5. The device as in claim 1, wherein said polarization element is a 45-degree Faraday rotator.

6. The device as in claim 1, wherein said polarization element is a half-wave plate.

7. A method for using the device of claim 1 to depolarize light, comprising using said device to process the input optical beam and to produce depolarized light by combining said first and said second beams upon being reflected back to said PBS.

8. A device, comprising:
   an input fiber to carry an input optical beam;
   a polarization element engaged to said input fiber to split said input optical signal into first and second beams with orthogonal polarizations;
   a first fiber coupled to said polarization element to receive said first beam;
   a first Faraday reflector coupled to an end of said first fiber to reflect said first beam back to said polarization element;
   a second fiber coupled to said polarization element to receive said second beam and having a different length from said first fiber; and
   a second Faraday reflector coupled to an end of said second fiber to reflect said second beam back to said polarization element,
   wherein said polarization element is operable to combine reflected first and second beams to produce a single output beam.

9. The device as in claim 1, further comprising a fiber stretcher engaged to one of said first and second fibers to change a difference between lengths of said first and second fibers.

10. The device as in claim 1, wherein a difference between lengths of said first and second fibers is greater than a coherent length of said input optical beam.

11. A method for using the device of claim 1 to depolarize light, comprising using said device to process the input optical beam and to produce depolarized light by combining said first and said second beams upon being reflected back to said PBS.

* * * * *

UNITED STATES PATENT AND TRADEMARK OFFICE
CERTIFICATE OF CORRECTION

PATENT NO. : 7,154,659 B1  Page 1 of 1
APPLICATION NO. : 10/418712
DATED : December 26, 2006
INVENTOR(S) : Xiaotian Steve Yao, Jane Chen and Yongqiang Shi It is certified that error appears in the above-identified patent and that said Letters Patent is hereby corrected as shown below:

Col. 10 in claim 9, please replace "claim 1" with --claim 8--.

Col. 10 in claim 10, please replace "claim 1" with --claim 8--.

Col. 10 in claim 11, please replace "claim 1" with --claim 8--.

Signed and Sealed this

Fifth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,154,659 B1
APPLICATION NO. : 10/418712
DATED             : December 26, 2006
INVENTOR(S)       : Xiaotian Steve Yao, Jane Chen and Yongqiang Shi Page 1 of 1

It is certified that error appears in the above-identified patent and that said Letters Patent is hereby corrected as shown below:

Col. 10 in claim 9, line 33, please replace "claim 1" with --claim 8--.

Col. 10 in claim 10, line 37, please replace "claim 1" with --claim 8--.

Col. 10 in claim 11, line 41, please replace "claim 1" with --claim 8--.

This certificate supersedes the Certificate of Correction issued May 5, 2009.

Signed and Sealed this

Twenty-sixth Day of May, 2009

JOHN DOLL
*Acting Director of the United States Patent and Trademark Office*